United States Patent
Yang (12)

(10) Patent No.: US 6,390,054 B1
(45) Date of Patent: May 21, 2002

(54) ENGINE CONTROL STRATEGY FOR A HYBRID HCCI ENGINE

(75) Inventor: Jialin Yang, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 109 days.

(21) Appl. No.: 09/648,521

(22) Filed: Aug. 26, 2000

(51) Int. Cl.⁷ ................................................ F02B 17/00
(52) U.S. Cl. ...................... 123/295; 123/305; 123/443
(58) Field of Search ................................ 123/295, 305, 123/443

(56) References Cited

U.S. PATENT DOCUMENTS

| | | | |
|---|---|---|---|
| 5,785,031 A | | 7/1998 | Akimoto et al. |
| 5,832,880 A | * | 11/1998 | Dickey ..................... 123/294 |
| 5,875,743 A | * | 3/1999 | Dickey ..................... 123/568 |
| 5,881,693 A | | 3/1999 | Mizuno |
| 5,896,840 A | | 4/1999 | Takahashi |
| 5,937,822 A | | 8/1999 | Nakajima |
| 5,954,023 A | | 9/1999 | Mizuno et al. |
| 5,975,045 A | | 11/1999 | Mizuno |
| 5,983,857 A | | 11/1999 | Mamiya et al. |
| 5,992,372 A | | 11/1999 | Nakajima |
| 6,032,637 A | | 3/2000 | Mamiya et al. |
| 6,213,086 B1 | * | 4/2001 | Chmela et al. |
| 6,286,482 B1 | * | 9/2001 | Flynn et al. ................. 123/295 |
| 6,324,835 B1 | * | 12/2001 | Surnilla et al. ............. 123/443 |
| 2002/0007816 A1 | * | 1/2002 | Zur Loye et al. ........... 123/295 |

* cited by examiner

Primary Examiner—Erick Solis
(74) Attorney, Agent, or Firm—Carlos L. Hanze

(57) ABSTRACT

A method of operating a hybrid homogenous-charge compression-ignition (HCCI) engine and spark ignition (SI) engine. The engine includes at least two cylinder groups, and each of the cylinder groups further include at least one cylinder. The method comprises the steps of detecting a transition request to transition the engine from a current operating mode to a desired operating mode. For example, a transition request from HCCI combustion mode to SI combustion mode, or vice versa. In response, the method transitions the first cylinder group from the current engine operating mode to the desired engine operating mode during a first time period, and transitions the second cylinder group from the current engine operating mode to the desired engine operating mode during a second time period. The second time period begins after the start of the first time period. In one aspect of the invention, the second time period begins after the end of the first time period, and in another aspect of the invention, the second time period overlaps the first time period.

20 Claims, 4 Drawing Sheets

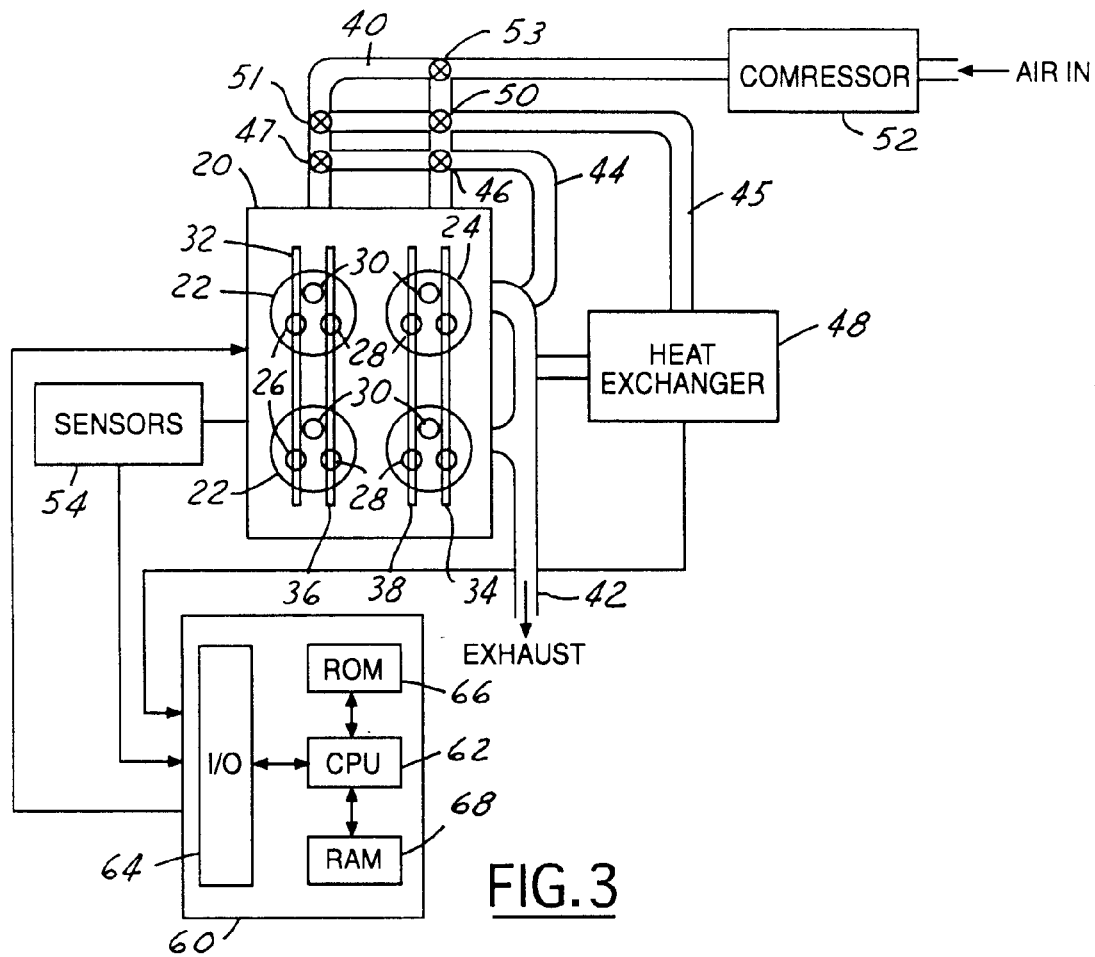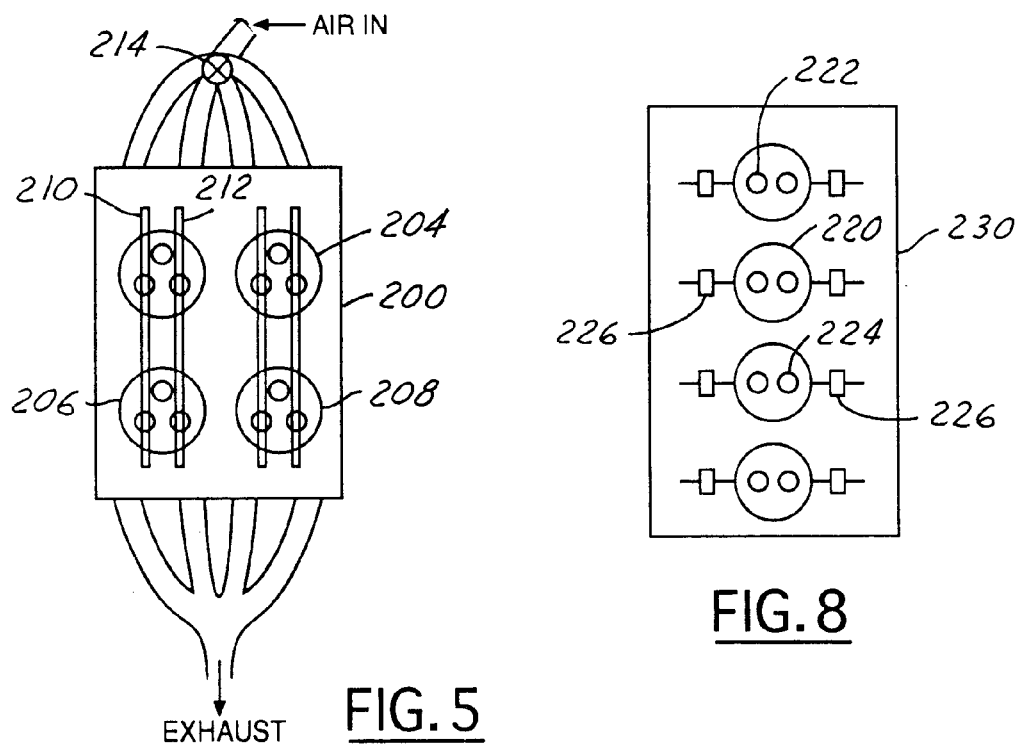

ENGINE CONTROL STRATEGY FOR A HYBRID HCCI ENGINE

CROSS REFERENCE TO RELATED APPLICATION

This application relates to co-pending U.S. patent application Ser. No. 09/470,359 entitled "Air-Fuel Charge Controller For A Homogeneous-Charge, Compression-Ignition Engine," filed Dec. 22, 1999, and U.S. patent application Ser. No. 09/573,743 filed on May 18, 2000, entitled "Cycle Strategies For A Hybrid HCCI Engine Using Variable Camshaft Timing." These applications are commonly owned by the assignee of the present invention.

BACKGROUND OF THE INVENTION

This invention relates to an engine control strategy for a hybrid homogeneous-charge compression-ignition (HCCI) and spark ignition (SI) engine, and more particularly to a strategy for combustion mode transition between HCCI and SI engine operation.

The HCCI engine is a relatively new type of engine. It has the benefits of very low $NO_x$ emissions due to the low combustion temperatures of the diluted mixture, and zero soot emissions due to the premixed lean mixture. Also, thermal efficiency of the HCCI engine is higher than SI engines and is comparable to conventional compression ignition engines due to the high compression ratio, unthrottled operation, high air-fuel ratio, reduced radiation heat transfer loss, and the low cycle-to-cycle variation of HCCI combustion.

The limitations of HCCI engines of known design relate to controlling the ignition timing and the combustion rate at different operating conditions. This is because combustion starts by auto-ignition when the mixture reaches a certain temperature. Thus, the air-fuel mixture is formed earlier before top dead center (TDC), and ignition can occur at any time during the compression process. Thus, as the engine load increases, the ignition tends to advance, and the combustion rate tends to increase due to the richer mixture. The thermal efficiency may also decrease due to the early heat release before TDC, and the engine becomes rough due to fast and early combustion.

When the engine load decreases, the ignition tends to be retarded which may eventually result in misfiring as well as an increase in HC and CO emissions. When the engine speed increases, the time for the main heat release tends to be retarded since the time available for low-temperature preliminary reaction of the diluted mixture becomes insufficient and misfiring may occur.

Supercharging the intake with a large amount of exhaust gas recirculation (EGR) can extend the HCCI operating range to higher loads. This approach, however, is constrained by peak cylinder pressure which becomes higher at higher intake pressure. In addition, during engine cold start, HCCI combustion is almost impossible unless a very high compression ratio is applied. For these reasons, application of HCCI technology for an automotive engine which requires a wide range of operating conditions, requires a dual HCCI-SI combustion mode engine. The engine operating conditions for HCCI combustion and for SI combustion, however, are quite different. To switch the combustion mode of the engine between HCCI and SI, the engine control parameters must be changed precisely and quickly. Otherwise, the engine may produce noticeable torque changes.

SUMMARY OF THE INVENTION

An object of the present invention is to provide a control system and method for operating a gasoline powered hybrid HCCI-SI engine over a wide load range including cold start. It is another object of the invention to provide a smooth transition between HCCI and SI combustion modes.

According to the present invention, the foregoing and other objects are attained by a method of operating a hybrid homogenous-charge compression-ignition (HCCI) engine and spark ignition (SI) engine. The engine includes at least two cylinder groups, and each of the cylinder groups further include at least one cylinder. The method comprises the steps of detecting a transition request to transition the engine from a current operating mode to a desired operating mode. For example, a transition request from HCCI combustion mode to SI combustion mode, or vice versa. In response, the method transitions the first cylinder group from the current engine operating mode to the desired engine operating mode during a first time period, and transitions the second cylinder group from the current engine operating mode to the desired engine operating mode during a second time period. The second time period begins after the start of the first time period. In one aspect of the invention, the second time period begins after the end of the first time period, and in another aspect of the invention, the second time period overlaps the first time period.

An advantage of the present invention is that it smoothly transitions between HCCI and SI combustion modes. Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should be made to the embodiments illustrated in greater detail in the accompanying drawings and described below by way of examples of the invention.

In the drawings:

FIG. 3 is a schematic block diagram of one embodiment of an HCCI-SI engine system according to the present invention.

FIG. 5 is another embodiment of an HCCI-SI engine according to the present invention.

FIG. 8 is another embodiment of an HCCI-SI engine according to the present invention.

DETAILED DESCRIPTION OF THE INVENTION

Figure 1:
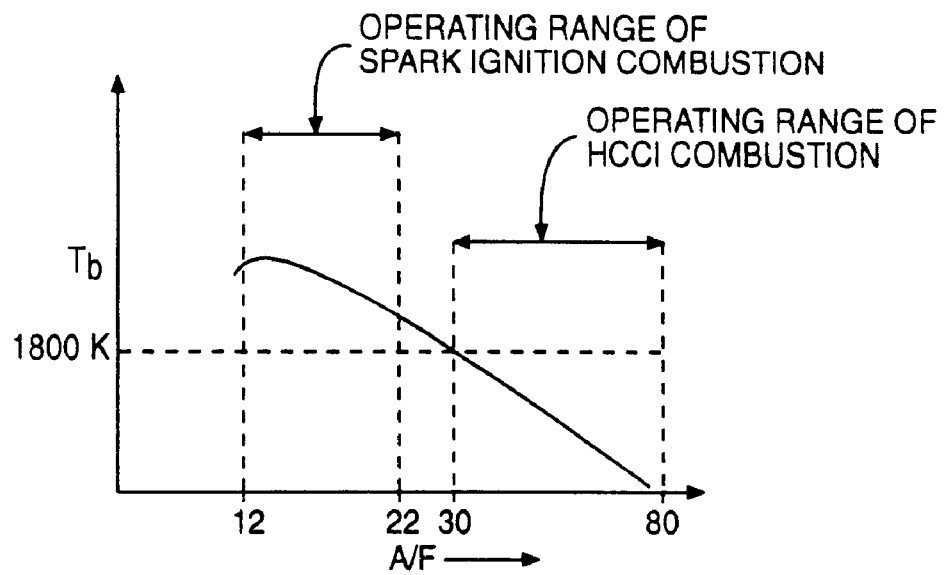
FIG. 1 is a graph illustrating the air-fuel ratio and burn temperature for an SI and HCCI Engine.

Referring now to FIG. 1, there is a shown a plot of the air-fuel ratio and the burn temperature for a spark ignition engine of conventional design and for a HCCI engine. As can be seen in FIG. 1, the conditions for HCCI combustion and for SI combustion are quite different. Typically, the air-fuel mixture burns in a spark ignition engine, following ignition, with a flame front that proceeds from the point of ignition throughout the combustion chamber region. As the flame progresses across the combustion chamber, the temperature of the burn changes. If the air-fuel ratio is high, there is minimal $NO_x$ in the exhaust gases. When the air-fuel ratio is low, however, the $NO_x$ is higher. Typically, the air-fuel ratio operating range for a SI engine is between 12 and 22.

In contrast to the narrow operating range for an SI engine shown in FIG. 1, the HCCI engine can operate with a very lean mixture, i.e., with an air-fuel ration as high as 80. The lean operation capability results in a low burned gas temperature (below 1800K), and extremely low $NO_x$ emissions. It also results in higher thermal efficiency due to the reduced engine pumping loss and higher specific heat ratios.

Figure 2:
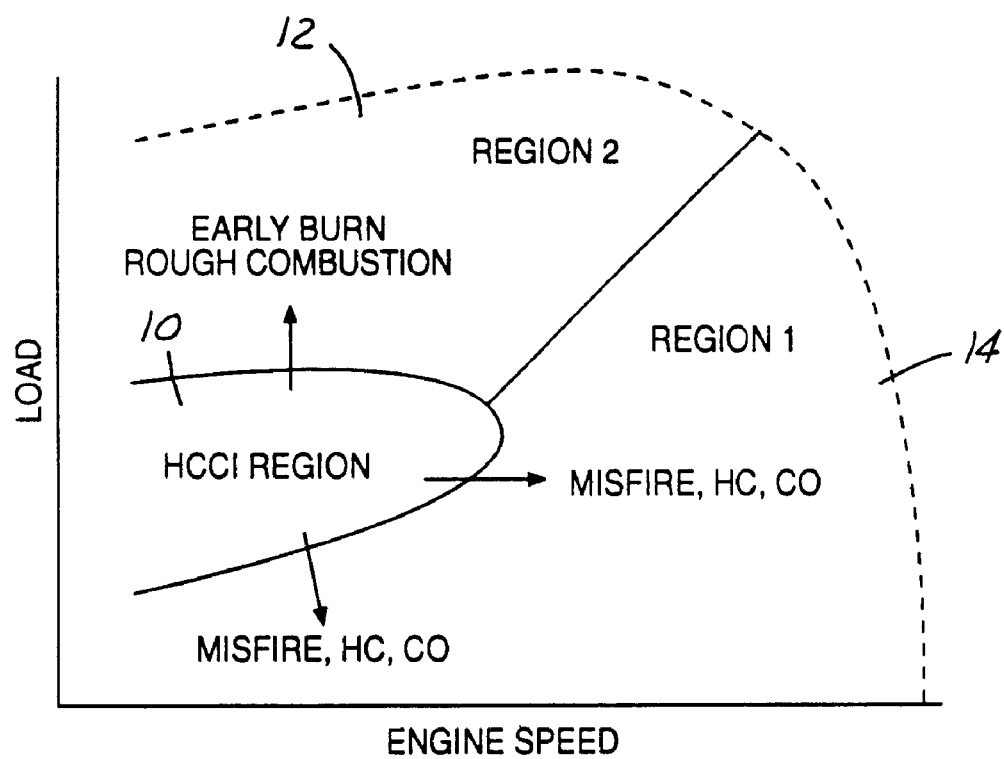
FIG. 2 is a plot of the load speed characteristics of an HCCI engine of the present invention.

FIG. 2 show a graph of the engine load versus engine speed and the various regions of performance for an HCCI engine. The region of optimum HCCI performance is shown at 10. If the load on the engine is increased beyond the region 10, the burn of the combustible mixture is started by auto ignition too early to achieve efficient combustion. This operating region is identified by reference numeral 12 in FIG. 2. On the other hand, if the load on the engine should decrease and the engine speed load characteristic is shifted to region 14 in FIG. 2, the engine is susceptible to misfire, and resulting increase in HC and CO emissions.

When the engine performance moves to either region 12 or 14, the engine controller will automatically enter the spark ignition operating mode. The operating characteristics for region 12 can be improved, however, while the engine continues to operate in HCCI mode by decreasing the air charge temperature. This can be done by reducing the internal exhaust gas recirculation, by controlling the coolant temperature, by retarding the intake valve closing time to reduce the effective compression ratio, by using cooled external exhaust gas recirculation, or by supercharging with an intercooler.

Conversely, the performance of the engine in operating region 14 can be improved by increasing the charge temperature by heating the intake air or using more exhaust gas recirculation or by using engine coolant control.

One system and method for controlling the air-fuel charge in an HCCI engine is taught by U.S. patent application Ser. No. 09/470,359 entitled "Air-Fuel Charge Controller For A Homogeneous-Charge, Compression-Ignition Engine," filed Dec. 22, 1999, which is herein incorporated by reference.

The system of the present invention will now be described with reference to FIG. 3. FIG. 3 shows a block diagram of one embodiment of an engine system in which the present invention may be used to advantage. In FIG. 3, there is shown an engine 20 which is a hybrid HCCI and SI engine. The engine 20 includes two groups of cylinders, the first group comprises two cylinders 22, the second group comprises two cylinders 24. Each cylinder 22, 24 includes an intake valve 26 and exhaust valve 28 and a spark plug 30. The intake valves 26 of the first cylinder group and second cylinder group are driven by camshafts 32 and 34, respectively. Similarly, the exhaust valve 28 of the first cylinder group and second cylinder group are driven by camshaft 36 and 38, respectively.

The engine 20 receives intake air via the intake manifold 40 and exhausts combustion gases via exhaust manifold 42. Because HCCI engine operation is directly related to the intake air charge temperature as shown in FIG. 1, the engine system of FIG. 3 includes several systems for controlling the intake air charge temperature. These systems include an EGR conduit 44 and associated EGR valves 46, 47 for recirculating the exhaust gases from the exhaust manifold 42 to the intake manifold 40. A heat exchanger 48 is also preferably included to control the intake air temperature. The heat exchanger can be heated by the engine coolant circulating through the engine block of the engine 20 and/or the heated exhaust gases flowing through the exhaust manifold 42. A control valves 50, 51 meter the amount of heated air inducted into the intake manifold 40. To further control the intake air temperature, a compressor 52 such as that associated with a supercharger or turbocharger is included to aid in reducing the intake air charge temperature when desired. Compressor 52 may also include an intercooler to reduce the intake air temperature.

The heat exchanger conduit 45 can deliver heated air to either the first group of cylinders 22 via valve 51 or the second group of cylinders 24 via valve 50. Similarly, the EGR conduit 44 can provide EGR to the first group of cylinders 22 via valve 47 or the second group of cylinders 24 via valve 46. Similarly, the compressor can deliver a compressed air charge to either group of cylinders by way of valve 53. In this way, the intake air charge characteristics can be independently controlled for both groups of cylinders. Of course, a single valve could also be used in place of the two valves shown for the EGR and heat exchanger conduits.

Although the engine 20 FIG. 3 is shown having an EGR system, heat exchanger 48 and compressor 52, it is to be understood that the method of the present invention can be used to advantage any HCCI-SI engine of which this is but one example. Other hybrid HCCI-SI engine may include different combinations of these systems for altering the intake air charge temperature and pressure, or use altogether different means for controlling the intake air charge temperature and pressure.

Similarly, the engine 20 of FIG. 3 is shown as having two groups of two cylinders wherein each cylinder includes a single intake and exhaust port. The methods of the present invention, however, are equally applicable to HCCI-SI engines having different valving and cylinder arrangements such as a V6 engine having two banks of three cylinders each, or a V8 engine having two banks of four cylinders each, or inline cylinder arrangements wherein the valve timing of individual cylinders or groups of cylinders can be independently controlled. Examples of various valving and camshaft arrangements for and a hybrid HCCI engine, and a control strategy for the same, is disclosed in U.S. patent application Ser. No. 09/573,743 filed on May 18, 2000, entitled "Cycle Strategies For A Hybrid HCCI Engine Using Variable Camshaft Timing," which is herein incorporated by reference.

One aspect of the present invention is that the camshaft 32, 34, 36 and 38 can be individually controlled for better control of the engine.

The engine 20 is preferably a gasoline-fueled HCCI and SI engine capable of operating over a wide load range including cold start conditions. In this way, at low load, the engine operates at HCCI combustion mode with a large amount of internal EGR or a large amount of residual gases, and a high compression ratio. This requires a large valve overlap or a large gap from the exhaust valve closing to the intake valve opening, and uses conventional intake valve closing (IVC) timing. During high load, high speed, or during engine cold start, the engine operates at SI combustion mode with a reduced internal EGR and a reduced effective compression ratio. This requires conventional valve overlap and late IVC timing. The IVC timing is adjusted with the change in load to control the intake air mass such that the mixture can be controlled in a cyclometric proportion (air-fuel ratio of 14.6). As a result, a conventional three-way catalyst can be used at the exhaust pipe to minimize $NO_x$, CO and HC emissions. During full load, the engine operates in SI combustion mode with reduced internal EGR. This requires a conventional valve overlap. The effective compression ratio, however, may or may not be reduced depending on whether a supercharger or turbocharger is applied.

Thus, it can be seen that the conditions for a HCCI operation and SI engine operation are quite different. For example, HCCI combustion requires a large amount of internal EGR by large valve overlap, intake air heating, and high compression ratio. In contrast, SI combustion operation requires a lower compression ratio by late intake valve closing, less internal EGR, and normal intake temperature. To switch between combustion modes, these control parameters are preferably changed precisely and quickly to avoid sudden changes in the engine output torque.

Engine 20 is controlled by an electronic engine controller 60. In general, controller 60 controls the engine operating parameters such as compression ratio, intake air charge temperature, engine air-fuel ratio, spark, EGR, etc. The controller 60 receives engine operating data from sensors 54 such as an exhaust gas oxygen sensor, engine coolant temperature sensor, mass airflow sensor, manifold pressure sensor, engine speed sensor, an ignition timing sensor and intake air charge temperature sensor. The controller 60 is a conventional microcomputer including a microprocessor unit 62, input/output ports 64, read-only memory 66, random access memory 68 and a conventional data bus. In addition to the outputs mentioned above, the engine controller 60 also controls the intake and exhaust valve timing by manipulating the independently controlled camshaft 32, 34, 36 and 38.

Figure 4:
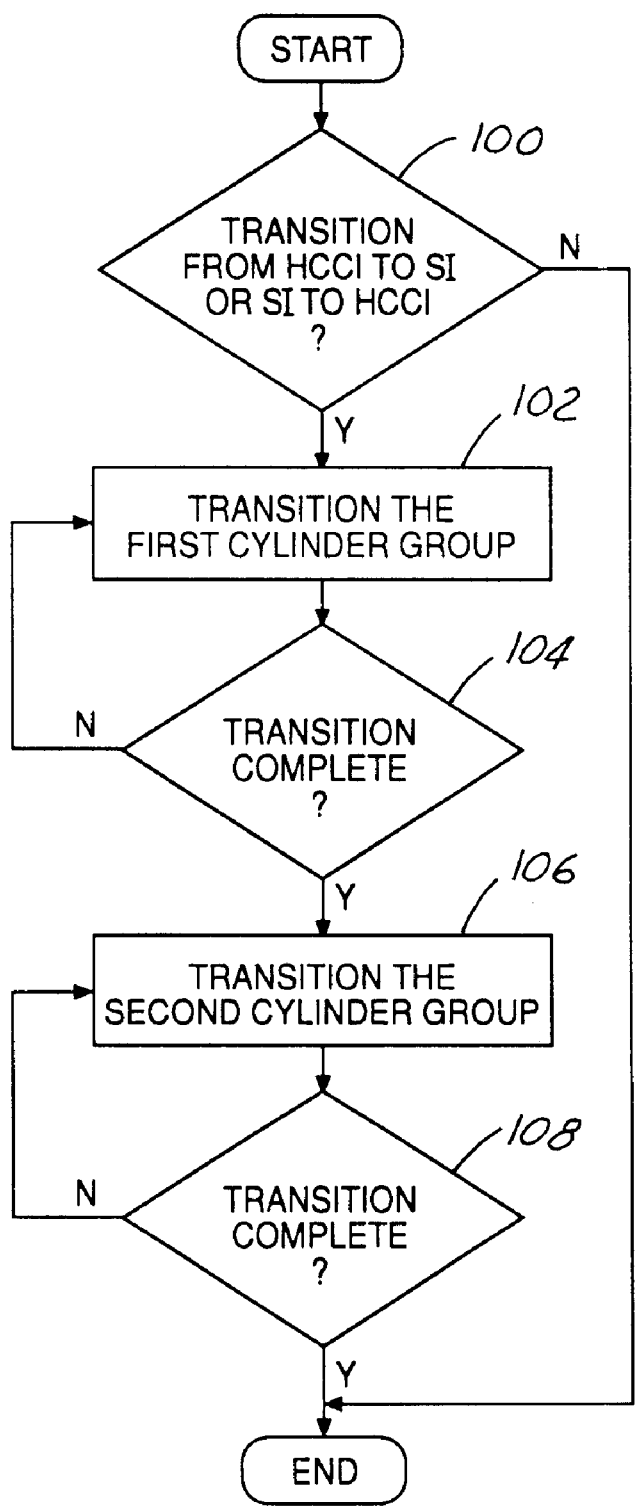
FIG. 4 is a logic flow diagram of one method of operating the HCCI-SI engine system of FIG. 3 according to the present invention.

FIG. 4 shows a logic flow diagram of one embodiment of the present method of controlling a hybrid HCCI-SI engine. In step 100, the engine control system determines whether the engine speed and load characteristics dictate that the engine operating mode change from either HCCI to SI, or if in SI mode, from SI to HCCI operating mode. If a change in operating mode is desired, the logic continues to step 102 wherein the first cylinder group is transitioned from one operating mode to the other, say, from HCCI to SI operating mode. For example, with reference to FIG. 3, the first group of cylinders 22 would be transitioned from HCCI operating mode to SI operating mode, while the second group of cylinders 24 would remain in HCCI mode.

Referring again to FIG. 4, the transition of the first cylinder group continues until it is complete in step 104. The method of transitioning can be any known method including those described in the above-referenced patent entitled "Cycle Strategies For A Hybrid HCCI Engine Using Variable Camshaft Timing." The transition from HCCI to SI would include such steps as lowering the compression ratio by late intake valve closing, reducing the internal EGR rate, and lowering the intake air charge temperature by, for example, bypassing the heat exchanger. On the other hand, to switch from SI mode to HCCI mode would require increasing the internal EGR rate by having a larger valve overlap, heating the intake air charge through, for example, the heat exchanger or by external EGR, and increasing the compression ratio by, for example, activating the compressor.

Once the transition for the first cylinder group is complete, the logic continues to step 106 where the next group of cylinders is likewise transitioned to the desired engine operating mode. This continues until the transition is complete in step 108 and the routine terminates until it is desired to change the operating mode of the engine once again.

Although the routine of FIG. 4 is shown as having transitions for two cylinder groups, it can be readily adapted to accommodate additional cylinder groups depending upon the particular design of the engine. For example, if each cylinder of the four cylinder engine shown in FIG. 3 can be independently controlled, the transition from HCCI operating mode to SI operating mode (and vice versa) could be accomplished by transitioning one cylinder at a time rather than as a group of cylinders. Similarly, in an eight cylinder arrangement, for example, the cylinders may be grouped into four groups of two cylinders each, or two groups of four cylinders each.

FIG. 5 shows a HCCI-SI engine 200 wherein each of the cylinders 202, 204, 206, 208 are independently controllable by way of associated intake and exhaust camshafts 210, 212. The associated camshafts allow the valve timing of each cylinder to be modified independent of the other cylinders. Similarly, an intake air valve 214 can be used to control the temperature and characteristics of the intake air flow to each cylinder. In this way, the temperature and pressure of the intake air to each cylinder 202, 204, 206, 208 can be independently controlled as well. By this arrangement, each cylinder can be transitioned from HCCI mode to SI operating mode or from SI operating to HCCI mode independent of the other cylinders. For example, if all cylinders 202, 204, 206 and 208 were operating in SI mode, they might each be characterized by the following operating parameters: a relatively low compression ratio (approximately 10:1), late intake valve closing timing, minimal internal EGR, and normal intake temperature. If the speed and load requirements of the engine 200 changed such that it was desirable to operate the engine in HCCI mode, each cylinder 202, 204, 206, 208 would transition to HCCI combustion mode having, for example, the following characteristics: a large amount of internal EGR by having a large intake and exhaust valve overlap, heated intake air, and a high compression ratio. Transition would take place seriatimly from cylinder 202 to cylinder 204 to cylinder 206 to cylinder 208 until all cylinders were operating in HCCI combustion mode. Of course, the order and pace of the transition would be a design choice depending upon the particular HCCI-SI engine design. Because each cylinder can be independently controlled, the cylinder transitions can overlap if desired. Thus, the cylinder 204, for example, may begin to transition before cylinder 202 has completed the transition from SI to HCCI combustion mode.

Figure 6:
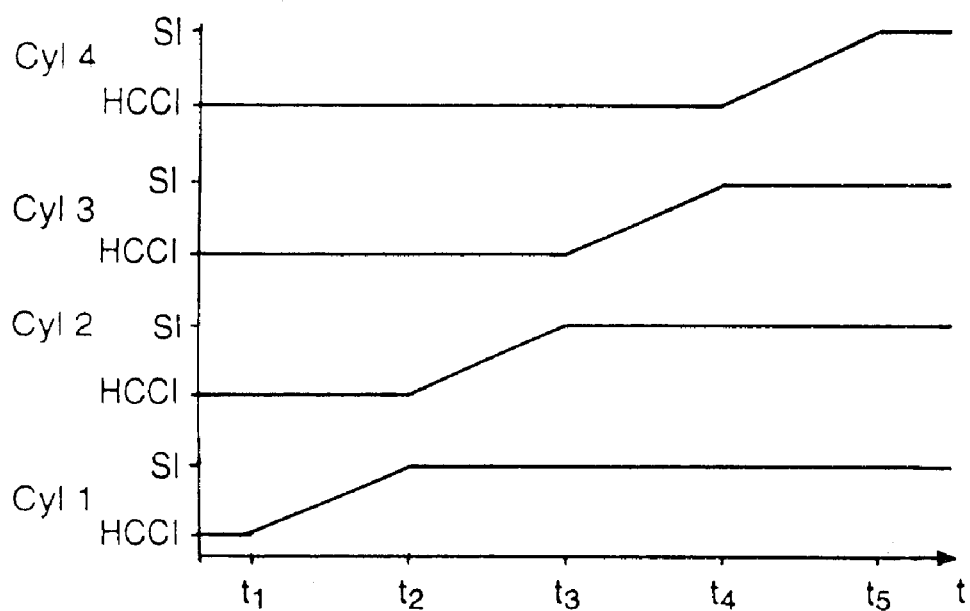
FIG. 6 is a timing diagram showing the operation of an HCCI-SI engine according to the present invention.

FIG. 6 shows a graphical representation of the transition cycle from HCCI to SI mode for a four cylinder engine according to one embodiment of the present invention. As shown in FIG. 6, cylinder one begins the transition at time $t_1$ completes the transition to SI mode at time $t_2$. Cylinder 2 begins the transition from HCCI combustion mode to SI mode at time $t_2$ and completes the transition at $t_3$. Cylinder 3 begins the transition after cylinder 2 of transition ($t_3$) and completes the transition at $t_4$, where cylinder 4 begins the transition. Thus, each cylinder is transitioned in turn after the preceding selected cylinder has completed the transition.

Figure 7:
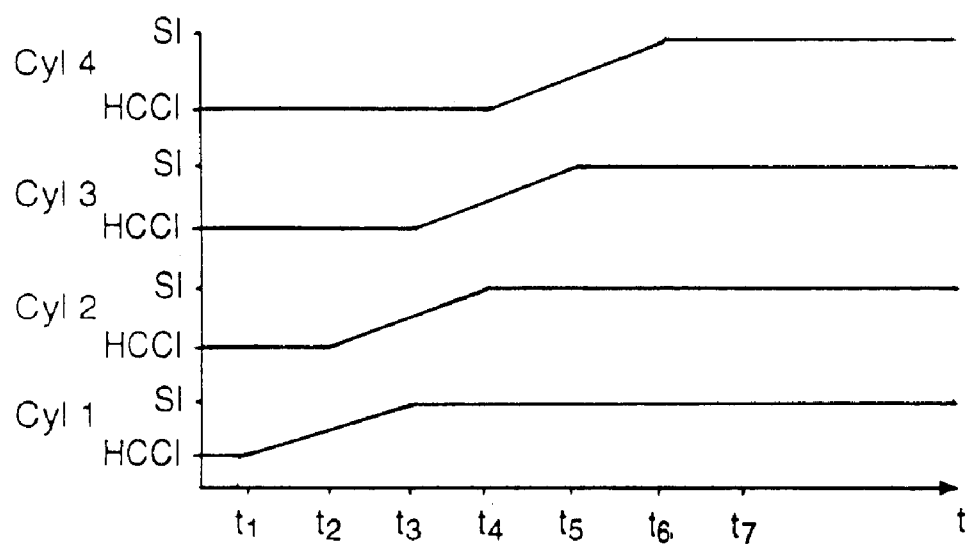
FIG. 7 is a another timing diagram showing the operation of an HCCI-SI engine according to the present invention.

FIG. 7 shows a graphical representation of an alternative transition schedule for a four cylinder engine according to the present invention. In this example, each cylinder begins the transition from HCCI combustion mode to SI combustion mode before the preceding cylinder has completed the transition. In other words, there is overlap between the transitioned phases. Thus, cylinder 1 begins the transition at time $t_1$ and completes the transition at time $t_3$, however, cylinder 2 begins the transition at time $t_2$ which is prior than time $t_3$. This continues until all of the cylinders have transitioned. Numerous similar examples are contemplated by the present invention. For example, in the context of a four cylinder engine, cylinders one and three could be transitioned simultaneously or in an overlap fashion and then cylinders two and four could likewise be transitioned. Also, the transition sequence and/or timing could be made different when transitioning from SI mode to HCCI mode versus HCCI mode to SI mode. Thus, if there were a sudden engine load change, the engine may transition from HCCI mode to SI mode rapidly by an overlapping transition scheme such as shown in FIG. 7, whereas the transition back to HCCI mode from SI mode may take place more gradually according to a transition scheme such as shown in FIG. 6 wherein each cylinder completes the transition before the next cylinder begins the transition.

FIG. 8 shows an alternative HCCI-SI engine in which the present invention may be used to advantage. In FIG. 8, each cylinder 220 has electronically actuated intake and exhaust valves 222, 224. In this case, an electronic actuator 226 control the opening and closing of each valve rather than the lobe of a camshaft. In this way, the relationship of the opening and closing of the intake and exhaust valves can be readily and easily modified to accommodate either HCCI combustion mode or SI combustion mode. In addition, although the engine 230 is shown as having only one intake and exhaust valve per cylinder, the transition scheme of the present invention can be readily adapted to multi valve per cylinder engines such as those shown in the referenced application entitled "Cycle Strategies For A Hybrid HCCI Engine Using Variable Camshaft Timing."

From the foregoing, it can be seen that there has been brought to the art a new and improved hybrid HCCI-SI engine which has the advantage of a smooth torque response when transitioning between HCCI combustion mode and SI combustion mode. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A method of operating a hybrid homogenous-charge compression-ignition (HCCI) engine and spark ignition (SI) engine, the engine having at least two cylinder groups, each of said cylinder groups comprising at least one cylinder, the method comprising the steps of:
    detecting a transition request to transition the engine from a current operating mode to a desired operating mode and, in response;
    transitioning the first cylinder group from the current engine operating mode to the desired engine operating mode during a first time period; and
    transitioning the second cylinder group from the current engine operating mode to the desired engine operating mode during a second time period, wherein the second time period is later than the first time period.

2. The method of claim 1 wherein the current operating mode is HCCI combustion mode and the desired operating mode is SI combustion mode.

3. The method of claim 1 wherein the current operating mode is SI combustion mode and the desired operating mode is HCCI combustion mode.

4. The method of claim 1 wherein the second time period begins at about the end of the first time period.

5. The method of claim 1 wherein the second time period overlaps the first time period.

6. The method of claim 1 wherein the relationship of the first and second time period is different when transitioning from HCCI mode to SI mode than when transitioning from SI mode to HCCI mode.

7. The method of claim 1 wherein the steps of transitioning include the steps of:
    modifying the engine intake air temperature;
    modifying the engine intake air pressure; and
    modifying the timing of an intake and an exhaust valve of each cylinder associated with said group of cylinders.

8. The method of claim 7 wherein the steps of transitioning further include the step of modifying an exhaust gas recirculation (EGR) rate of said engine.

9. The method of claim 7 wherein the step of modifying the timing of said intake and exhaust valves includes the steps of operating the intake valve by a first variable camshaft and operating the exhaust valve by a second variable camshaft.

10. The method of claim 7 wherein the step of modifying the timing of said intake and exhaust valves includes the steps of operating the intake valve by a first electronic valve actuator and operating the exhaust valve by a second electronic valve actuator.

11. A hybrid homogenous-charge compression-ignition (HCCI) engine and spark ignition (SI) engine system comprising:
    an engine comprising at least two cylinder groups, each of said cylinder groups comprising at least one cylinder; and
    a controller in operative communication with said engine, said controller programmed to perform the following steps:
        determine an engine load condition; and
        determine a desired engine operating mode from between an HCCI operating mode and SI operating mode as a function of said engine load condition and, if said desired engine operating mode is different that a current engine operating mode, transition the first cylinder group from the current engine operating mode to the desired engine operating mode during a first time period, and transition the second cylinder group from the current engine operating mode to the desired engine operating mode during a second time period, wherein the second time period is later than the first time period.

12. The hybrid engine system of claim 11 wherein the second time period begins at about the end of the first time period.

13. The hybrid engine system of claim 11 wherein the second time period overlaps the first time period.

14. The hybrid engine system of claim 11 wherein the relationship of the first and second time period is different when transitioning from HCCI mode to SI mode than when transitioning from SI mode to HCCI mode.

15. The hybrid engine system of claim 11 wherein each cylinder comprises at least one intake valve and at least one exhaust valve and said intake valve is controlled by a first variable valve timing device and said exhaust valve is controlled by a second variable valve timing device.

16. The hybrid engine system of claim 11 wherein said engine comprises two cylinder groups and each of the cylinder groups comprise two cylinders.

17. In a vehicle having a hybrid homogenous-charge compression-ignition (HCCI) engine and spark ignition (SI) engine, the engine having at least two cylinder groups, each of said cylinder groups comprising at least one cylinder, a method of transitioning between HCCI combustion mode and SI combustion mode, the method comprising the steps of:

detecting a transition request to transition the engine from a current operating mode selected from HCCI combustion mode and SI combustion mode to the other operating mode and, in response;

transitioning the first cylinder group from the current engine operating mode to the other engine operating mode during a first time period; and transitioning the second cylinder group from the current engine operating mode to the other engine operating mode during a second time period, wherein the second time period begins after the start of the first time period.

18. The method of claim 17 wherein the second time period begins after the end of the first time period.

19. The method of claim 17 wherein the second time period overlaps the first time period.

20. The method of claim 17 wherein the relationship of the first and second time period is different when transitioning from HCCI mode to SI mode than when transitioning from SI mode to HCCI mode.

\* \* \* \* \*